US010246089B2

(12) United States Patent
Sasabuchi

(10) Patent No.: US 10,246,089 B2
(45) Date of Patent: Apr. 2, 2019

(54) COLLISION AVOIDANCE ASSIST APPARATUS, COLLISION AVOIDANCE ASSIST METHOD, AND PROGRAM

(71) Applicant: HONDA MOTOR CO., LTD., Minato-ku, Tokyo (JP)

(72) Inventor: Yoji Sasabuchi, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/684,566

(22) Filed: Apr. 13, 2015

(65) Prior Publication Data

US 2015/0307093 A1    Oct. 29, 2015

(30) Foreign Application Priority Data

Apr. 24, 2014   (JP) ................................ 2014-090228

(51) Int. Cl.
*B60W 30/095* (2012.01)
*B60W 10/18* (2012.01)
*B60W 10/20* (2006.01)

(52) U.S. Cl.
CPC ........ *B60W 30/0953* (2013.01); *B60W 10/18* (2013.01); *B60W 10/20* (2013.01);
(Continued)

(58) Field of Classification Search
CPC ......... B60W 30/0953; B60W 2550/10; B60W 30/08; B60W 30/095; B60W 30/093;
(Continued)

(56) References Cited

U.S. PATENT DOCUMENTS 5,332,057 A *  7/1994  Butsuen ............. B60K 31/0008
                                                180/169
6,337,637 B1 *  1/2002  Kubota ..................... B60T 7/18
                                                180/271
(Continued)

FOREIGN PATENT DOCUMENTS

CN          101622160 A      1/2010
JP         2011-085476 A     4/2011
(Continued)

OTHER PUBLICATIONS

Office Action dated Nov. 22, 2016 for Japanese Patent Application No. 2014-090228 with English translation.
(Continued)

*Primary Examiner* — Angelina Shudy
(74) *Attorney, Agent, or Firm* — Carrier Blackman & Associates, P.C.; William D. Blackman; Joseph P. Carrier

(57) ABSTRACT

A collision avoidance assist apparatus includes: an object detection part configured to detect a second moving object that crosses ahead in a travel direction of a first moving object; an estimation part configured to estimate a relationship between a future location of the first moving object and a future location of the second moving object based on a location of the detected second moving object; and a determination part configured to determine that there is a possibility that the first moving object and the second moving object will collide with each other in a case where the second moving object is capable of passing the first moving object without colliding with the first moving object based on the estimated relationship and a relationship between the first moving object and the second moving object when the second moving object passes the first moving object satisfies a predetermined condition.

6 Claims, 7 Drawing Sheets

(52) U.S. Cl.
CPC ..... *B60W 30/0956* (2013.01); *B60W 2420/42* (2013.01); *B60W 2420/52* (2013.01); *B60W 2520/10* (2013.01); *B60W 2550/10* (2013.01); *B60W 2550/306* (2013.01)

(58) Field of Classification Search
CPC ............ B60W 30/09; B60W 2520/10; B60W 2550/306; B60W 2420/52; B60W 2420/42; B60W 30/0956; B60W 10/20; B60W 10/18; G01S 13/93; G08G 1/16; B60T 7/22
USPC ....................................................... 701/1, 301
See application file for complete search history.

(56) References Cited

U.S. PATENT DOCUMENTS

| | | | | |
|---|---|---|---|---|
| 7,095,336 | B2* | 8/2006 | Rodgers | G08G 1/166 340/435 |
| 7,124,027 | B1* | 10/2006 | Ernst, Jr. | B60W 30/09 340/435 |
| 7,369,941 | B2* | 5/2008 | Schiffmann | G01S 13/878 340/435 |
| 7,409,295 | B2* | 8/2008 | Paradie | G06T 7/70 701/301 |
| 7,647,178 | B2* | 1/2010 | Ekmark | G08G 1/161 340/436 |
| 8,164,432 | B2* | 4/2012 | Broggi | G01S 17/023 340/425.5 |
| 8,380,425 | B2* | 2/2013 | Duggan | G08G 5/0069 244/175 |
| 8,547,249 | B2* | 10/2013 | David | G08G 1/166 340/435 |
| 8,589,061 | B2* | 11/2013 | Bengtsson | G08G 1/16 180/275 |
| 8,655,579 | B2* | 2/2014 | Sakugawa | B60W 30/0956 340/435 |
| 8,659,406 | B2* | 2/2014 | Usami | B60Q 1/143 340/425.5 |
| 8,674,819 | B2* | 3/2014 | Ito | B60Q 9/008 340/435 |
| 8,762,043 | B2* | 6/2014 | Eidehall | B62D 15/0265 701/301 |
| 8,838,371 | B2* | 9/2014 | Sakai | G08G 1/16 701/300 |
| 8,890,674 | B2* | 11/2014 | Zeiger | B60K 35/00 340/439 |
| 8,918,255 | B2* | 12/2014 | Schaab | B60T 7/042 701/41 |
| 8,954,252 | B1* | 2/2015 | Urmson | G08G 1/166 180/167 |
| 9,168,921 | B2* | 10/2015 | Groult | B62D 15/029 |
| 9,262,924 | B2* | 2/2016 | McNew | G01C 21/365 |
| 9,321,460 | B2* | 4/2016 | Sasabuchi | B61L 23/041 |
| 9,437,111 | B2* | 9/2016 | Ignaczak | G08G 1/166 |
| 9,440,619 | B2* | 9/2016 | Sugihara | B60R 25/02126 |
| 9,457,809 | B2* | 10/2016 | Sasabuchi | B60W 30/0956 |
| 9,487,195 | B2* | 11/2016 | Fujishiro | B60W 10/18 |
| 9,517,755 | B1* | 12/2016 | Chen | B60T 7/22 |
| 9,517,767 | B1* | 12/2016 | Kentley | B60N 2/002 |
| 9,625,911 | B2* | 4/2017 | Lee | G05D 1/0214 |
| 9,630,619 | B1* | 4/2017 | Kentley | B60W 30/09 |
| 9,656,667 | B2* | 5/2017 | Agnew | B60W 30/09 |
| 9,672,736 | B2* | 6/2017 | Lovell | G08G 1/04 |
| 9,731,717 | B2* | 8/2017 | Kim | B60W 30/09 |
| 9,804,599 | B2* | 10/2017 | Kentley-Klay | G05D 1/0088 |
| 9,834,210 | B2* | 12/2017 | Ohbayashi | B60W 30/085 |
| 9,862,416 | B2* | 1/2018 | Imai | G08G 1/166 |
| 9,896,095 | B2* | 2/2018 | Katoh | B60W 10/18 |
| 9,898,929 | B2* | 2/2018 | Harada | G01S 13/867 |
| 9,977,973 | B2* | 5/2018 | Okuda | G06K 9/00798 |
| 10,023,204 | B1* | 7/2018 | Kim | B60W 50/14 |
| 10,071,748 | B2* | 9/2018 | Gupta | B60K 35/00 |
| 10,093,289 | B2* | 10/2018 | Lee | B60T 7/22 |
| 2005/0060117 | A1* | 3/2005 | Kunzler | G01S 13/586 702/149 |
| 2005/0073438 | A1* | 4/2005 | Rodgers | G08G 1/161 340/944 |
| 2005/0165550 | A1* | 7/2005 | Okada | G08G 1/166 701/301 |
| 2008/0040040 | A1* | 2/2008 | Goto | G05D 1/024 701/301 |
| 2008/0162027 | A1* | 7/2008 | Murphy | B60W 50/14 701/117 |
| 2009/0143987 | A1* | 6/2009 | Bect | B60R 21/0134 701/301 |
| 2009/0192710 | A1 | 7/2009 | Eidehall et al. | |
| 2009/0299593 | A1* | 12/2009 | Borchers | B60W 10/184 701/70 |
| 2010/0030474 | A1* | 2/2010 | Sawada | G08G 1/163 701/301 |
| 2010/0205132 | A1* | 8/2010 | Taguchi | G08G 1/167 706/46 |
| 2010/0217483 | A1* | 8/2010 | Matsuno | G08G 1/165 701/36 |
| 2010/0283663 | A1* | 11/2010 | Sasabuchi | G01S 13/588 342/70 |
| 2010/0305858 | A1* | 12/2010 | Richardson | G06K 9/00785 701/301 |
| 2011/0288774 | A1 | 11/2011 | Bengtsson et al. | |
| 2011/0307176 | A1* | 12/2011 | Sun | G08G 1/168 701/301 |
| 2012/0035846 | A1* | 2/2012 | Sakamoto | B60T 8/17558 701/301 |
| 2012/0262284 | A1* | 10/2012 | Irrgang | B60W 30/0956 340/435 |
| 2012/0283895 | A1* | 11/2012 | Noda | G08G 1/166 701/1 |
| 2013/0013184 | A1* | 1/2013 | Morotomi | G08G 1/166 701/301 |
| 2013/0223686 | A1* | 8/2013 | Shimizu | G06K 9/00624 382/103 |
| 2014/0195141 | A1* | 7/2014 | Nagata | B60T 7/22 701/301 |
| 2014/0203925 | A1 | 7/2014 | Augst | |
| 2014/0316668 | A1* | 10/2014 | Akiyama | B60W 10/184 701/70 |
| 2014/0324330 | A1* | 10/2014 | Minemura | G08G 1/16 701/301 |
| 2015/0049908 | A1* | 2/2015 | Ogawa | G08G 1/166 382/103 |
| 2015/0066348 | A1* | 3/2015 | Baba | G08G 1/166 701/301 |
| 2015/0219761 | A1* | 8/2015 | Inomata | G08G 1/166 701/301 |
| 2015/0232073 | A1* | 8/2015 | Fujishiro | B60T 7/22 701/70 |
| 2015/0291159 | A1* | 10/2015 | Sasabuchi | B60W 30/0956 701/1 |
| 2015/0298693 | A1* | 10/2015 | Uechi | G08G 1/166 701/70 |
| 2015/0338516 | A1* | 11/2015 | Kijima | G01S 13/867 701/1 |
| 2016/0114798 | A1* | 4/2016 | Kim | B60W 30/09 701/41 |
| 2016/0167580 | A1* | 6/2016 | Hanita | B60Q 9/008 701/301 |
| 2017/0080952 | A1* | 3/2017 | Gupta | B60K 35/00 |
| 2017/0120804 | A1* | 5/2017 | Kentley | G05D 1/0088 |

FOREIGN PATENT DOCUMENTS

| | | |
|---|---|---|
| JP | 2013239015 A | 11/2013 |
| JP | 2014139756 A | 7/2014 |

(56) References Cited

FOREIGN PATENT DOCUMENTS

| WO | 2013030903 A1 | 3/2013 |
| WO | 2013045374 A1 | 4/2013 |

OTHER PUBLICATIONS

Office Action dated Dec. 5, 2016 for German Patent Application No. 10 2015 207 098.0 with English translation.
Office Action dated Dec. 30, 2016 for Chinese Patent Application No. 2015101337337 with partial English translation.

* cited by examiner (A)

(B)

(C)

COLLISION AVOIDANCE ASSIST APPARATUS, COLLISION AVOIDANCE ASSIST METHOD, AND PROGRAM

CROSS-REFERENCE TO RELATED APPLICATION

Priority is claimed on Japanese Patent Application No. 2014-90228, filed on Apr. 24, 2014, the contents of which are incorporated herein by reference.

BACKGROUND

Field of the Invention

The present invention relates to a collision avoidance assist apparatus, a collision avoidance assist method, and a program.

Background

An object detection apparatus is known which detects a laterally moving object that cuts in front of a vehicle based on the reflection of laser light. When the laterally moving object is, for example, a two-wheeled vehicle, the wheel portion having a small reflection area of laser light or having a low reflectance of laser light is not detected, and only a portion of a person riding on the two-wheeled vehicle is detected. Therefore, the length in the lateral direction of the detected laterally moving object becomes shorter than the actual length of the two-wheeled vehicle. Accordingly, an apparatus is proposed which performs an increase adjustment in which the length in the travel direction of the laterally moving object is increased when predicting the future location of the laterally moving object (for example, refer to Japanese Patent Application, Publication No. 2011-85476A).

SUMMARY

However, there is a problem in that, even when it is determined that a collision is avoidable based on the predicted future location of the laterally moving object, in a case where the vehicle and the laterally moving object are too close to each other when the laterally moving object actually crosses in front of the vehicle, a person may feel afraid.

In view of the foregoing, an object of an aspect of the present invention is to provide a collision avoidance assist apparatus, a collision avoidance assist method, and a program capable of relaxing a scare at the time of passing another moving object.

(1) A collision avoidance assist apparatus according to an aspect of the present invention includes: an object detection part configured to detect a second moving object that crosses ahead in a travel direction of a first moving object; an estimation part configured to estimate a relationship between a future location of the first moving object and a future location of the second moving object based on a location of the second moving object detected by the object detection part; and a determination part configured to determine that there is a possibility that the first moving object and the second moving object will collide with each other in a case where the second moving object is capable of passing the first moving object without colliding with the first moving object based on the relationship estimated by the estimation part and a relationship between the first moving object and the second moving object when the second moving object passes the first moving object satisfies a predetermined condition.

(2) In the aspect of the above (1), the determination part may obtain a hazard region including an extension region that extends rearward in a travel direction of the second moving object positioned at the future location based on the future location of the second moving object estimated by the estimation part and may determine that there is a possibility that the first moving object will collide with the second moving object in a case where the hazard region and the future location of the first moving object overlap each other.

(3) In the aspect of the above (2), the determination part may change the size of the extension region depending on the amplitude of a speed of the second moving object.

(4) In the aspect of the above (1), the determination part may determine that there is a possibility that the first moving object and the second moving object will collide with each other in a case where a distance between the future location of the first moving object and the future location of the second moving object based on the relationship estimated by the estimation part is less than a predetermined distance, or in a case where an amount of time for the first moving object to arrive at a path of the second moving object indicated by the future location is less than a predetermined amount of time.

(5) In the aspect of the above (4), the determination part may change the predetermined distance or the predetermined time depending on the amplitude of a speed of the second moving object.

(6) A collision avoidance assist apparatus according to another aspect of the present invention includes: an object detection part configured to detect a second moving object that crosses ahead in a travel direction of a first moving object; an estimation part configured to estimate a relationship between a future location of the first moving object and a future location of the second moving object based on a location of the second moving object detected by the object detection part; and a drive assist part configured to perform a drive assist of the first moving object in a case where the second moving object is capable of passing the first moving object without colliding with the first moving object and the relationship estimated by the estimation part satisfies a predetermined condition.

(7) A collision avoidance assist method according to another aspect of the present invention includes: (a) detecting a second moving object that crosses ahead in a travel direction of a first moving object; (b) estimating a relationship between a future location of the first moving object and a future location of the second moving object based on a location of the second moving object detected in (a); and (c) determining that there is a possibility that the first moving object and the second moving object will collide with each other in a case where the second moving object is capable of passing the first moving object without colliding with the first moving object and the relationship estimated in (b) satisfies a predetermined condition.

(8) According to another aspect of the present invention, there is provided a non-transitory computer-readable recording medium including a program for causing a computer to execute: (a) detecting a second moving object that crosses ahead in a travel direction of a first moving object; (b) estimating a relationship between a future location of the first moving object and a future location of the second moving object based on a location of the second moving object detected in (a); and (c) determining that there is a possibility that the first moving object and the second moving object will collide with each other in a case where the second moving object is capable of passing the first moving object without colliding with the first moving object and the relationship estimated in (b) satisfies a predetermined condition.

According to the aspects of the above (1) to (8), even when a collision with the second moving object is avoidable, in a case where the moving objects are too close to each other when the second moving object actually crosses in front of the first moving object, it is possible to perform a drive assist of the first moving object. Accordingly, the first moving object is capable of running away from the second moving object when the second moving object crosses in front of the first moving object, and it is possible to reduce the possibility of a driver being startled at the time of passing.

According to the aspect of the above (2), it is possible to prevent the first moving object from approaching too close to the rearward portion of the second moving object when the second moving object actually crosses in front of the first moving object.

According to the aspects of the above (3) and (5), it is possible to reduce the possibility of a driver being further startled when passing the second moving object having a fast movement speed compared to when passing the second moving object having a slow movement speed.

DESCRIPTION OF THE EMBODIMENTS

Hereinafter, a collision avoidance assist apparatus 1 according to an embodiment of the present invention will be described with reference to the drawings.

Figure 1:
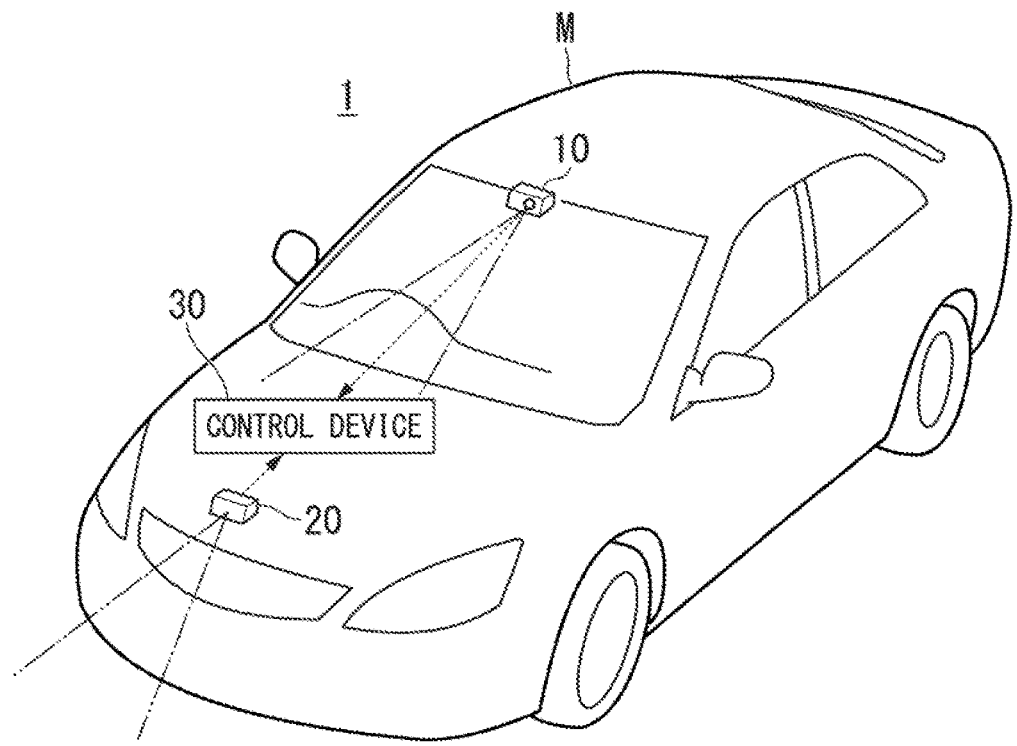
FIG. 1 is a diagram schematically showing an example of a configuration of a collision avoidance assist apparatus according to an embodiment.

FIG. 1 is a diagram schematically showing an example of a configuration of the collision avoidance assist apparatus 1 according to a first embodiment. The collision avoidance assist apparatus 1 is, for example, an apparatus provided on a vehicle M (first moving object) as a moving object and includes a camera 10, a radar device 20, and a control device 30. The collision avoidance assist apparatus 1 is an apparatus that determines a collision possibility between the vehicle M and a laterally moving object H (second moving object). The laterally moving object H is an example of a moving object detected by the collision avoidance assist apparatus 1.

The camera 10 is, for example, a digital camera attached to the upper portion of a front windshield, the back surface of a rearview mirror, or the like and using a solid-state imaging device such as a CCD (Charge Coupled Device) and a CMOS (Complementary Metal Oxide Semiconductor). For example, the camera 10 repeatedly captures the image ahead of the vehicle at predetermined intervals and outputs image data of the captured image to the control device 30.

The radar device 20 is, for example, attached to the back side of an emblem plate of the vehicle M, the periphery of a bumper or a front grille, or the like. The radar device 20, for example, radiates a millimeter wave forward of the vehicle M, receives a reflection wave reflected by the object ahead of the vehicle M, and thereby detects at least the location (distance and azimuth angle) of the object. Further, the radar device 20 may be a device capable of detecting a relative speed to the object. The radar device 20, for example, detects the location or speed of the object by use of an FM-CW (Frequency-Modulated Continuous-Wave) method and outputs a detection result to the control device 30.

The control device 30 is, for example, a computer device in which an internal bus connects a processor such as a CPU (Central Processing Unit), a storage device such as a ROM (Read Only Memory), a RAM (Random Access Memory), a HDD (Hard Disk Drive), an EEPROM (Electrically Erasable Programmable Read-Only Memory), and a flash memory, a communication interface for performing communication with other devices in the vehicle, and the like.

Figure 2:
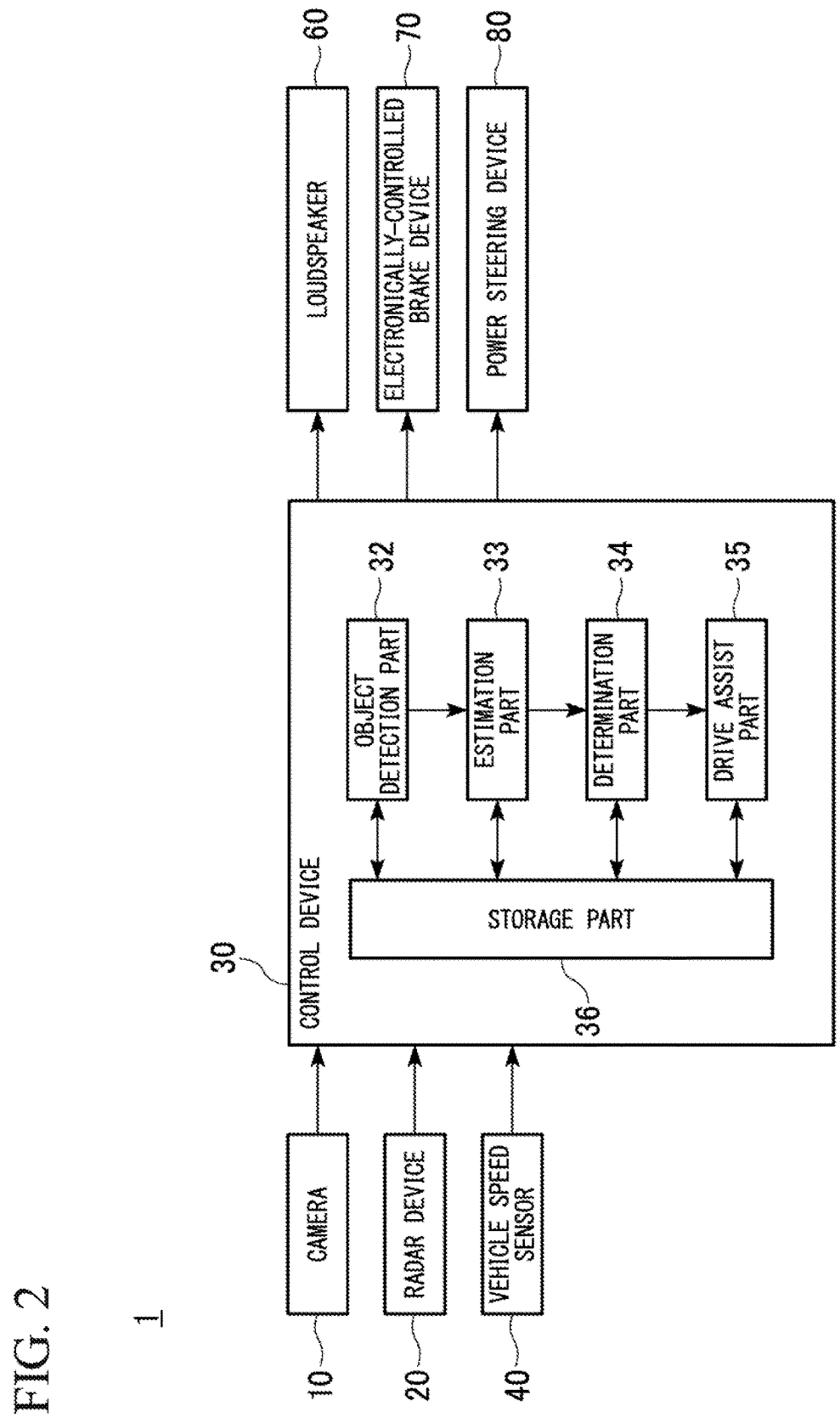
FIG. 2 is diagram showing a functional configuration example of the collision avoidance assist apparatus.

FIG. 2 is diagram showing a functional configuration example of the collision avoidance assist apparatus 1. The collision avoidance assist apparatus 1 further includes a vehicle speed sensor 40, a loudspeaker 60, an electronically-controlled brake device 70, and a power steering device 80.

The vehicle speed sensor 40 detects the speed of the vehicle M. For the vehicle speed sensor 40, a commonly-used detection means that detects the speed of a moving object such as a vehicle is available. For example, a wheel speed sensor attached to each of the wheels, a computer that generates a vehicle speed signal based on a sensor output, a rotation angle sensor attached to, for example, a speed gear, or the like is available for the vehicle speed sensor 40.

The loudspeaker 60 outputs speech in response to an instruction signal from the control device 30.

The electronically-controlled brake device 70 includes: a master cylinder in which a brake operation applied to a brake pedal is transmitted as an oil pressure; a reservoir tank that reserves a brake fluid; a brake actuator that adjusts a brake force output to each wheel; a controller that controls these units; and the like. The controller of the electronically-controlled brake device 70 controls a brake actuator or the like such that a brake torque depending on the pressure of the master cylinder is output to each wheel. Further, the controller of the electronically-controlled brake device 70 controls a brake actuator or the like such that when a control signal is input from the control device 30, a brake torque having an intensity indicated by the control signal is output to each wheel. Note that, when the brake operation of the driver and the input of the control signal are performed at the same time, the controller of the electronically-controlled brake device 70 may give priority to the brake operation of the driver or may perform a control in which the input of the control signal is added to the brake operation of the driver. The electronically-controlled brake device 70 is not limited to the above-described electronically-controlled brake device which operates by the oil pressure and may be an electronically-controlled brake device which operates by an electric actuator.

The power steering device 80 includes, for example, an electric motor capable of giving a force to a rack-and-pinion mechanism and changing the direction of steering wheels, a steering torque sensor, a steering angle sensor that detects a steering angle (or actual steering angle), a controller that controls these units, and the like.

The controller of the power steering device 80 detects a steering torque which arises from the operation of the steering wheel by the driver, rotates the electric motor in the direction according to the steering torque, and thereby assists the steering operation of the driver. Further, when a control signal is input from the control device 30, the controller of the power steering device 80 drives the electric motor in the direction and with the intensity indicated by the control signal. Note that, when the steering operation of the driver and the input of the control signal are performed at the same time, the controller of the power steering device 80 may give priority to the steering operation of the driver or may perform a control in which the input of the control signal is added to the steering operation of the driver.

Next, the control device 30 is described.

The control device 30 includes an object detection part 32, an estimation part 33, a determination part 34, and a drive assist part 35 as a functional configuration. Further, the control device 30 includes a storage part 36.

The functional parts are, for example, software functional parts that function by executing a program stored in the storage part 36 by the processor. The program executed by the processor may be stored in the storage part 36 in advance before shipping of the vehicle M. A program stored in a portable storage medium may be installed in the storage part 36 of the control device 30 and may be executed by the processor. Further, the program may be downloaded from another computer device using an in-vehicle internet apparatus and may be installed in the storage part 36 of the control device 30. Further, part or all of the above functional parts may be a hardware functional part such as an LSI (Large Scale Integration) or an ASIC (Application Specific Integrated Circuit). Further, the drive assist part 35 may be realized by another computer different from other functional parts. Further, the storage part 36 is a ROM (Read Only Memory), a RAM (Random Access Memory), a HDD (Hard Disk Drive), an EEPROM (Electrically Erasable Programmable Read-Only Memory), a flash memory, and the like.

The object detection part 32 identifies, based on image data input from the camera 10 and the location of the laterally moving object H input from the radar device 20, the location of the laterally moving object H (in the embodiment, a person) which is present ahead of the vehicle M. The object detection part 32, for example, applies an edge point extraction process or the like on image data input from the camera 10 to thereby extract the laterally moving object H included in the image and converts the location on the image of the laterally moving object H into a location on a real space to thereby detect the location of the laterally moving object H. The object detection part 32 integrates the location of the laterally moving object H obtained by such an image analysis and the location of the laterally moving object H input from the radar device 20 and identifies the location of the laterally moving object H which is present ahead of the vehicle M. In the embodiment, the object detection part 32 identifies a plurality of locations in the travel direction of the laterally moving object H. For example, the object detection part 32 identifies locations of a front end portion and a rear end portion in the travel direction of the laterally moving object H. Note that, the object detection part 32 may identify locations of a plurality of points which are present between the front end portion and the rear end portion in addition to the locations of the front end portion and the rear end portion.

Here, of the elements constituting the location of the laterally moving object H, the distance (distance between the vehicle M and the laterally moving object H) can be detected accurately by the radar device 20, and the lateral location (offset amount relative to the travel direction of the vehicle) can be detected accurately by the image analysis of the camera 10. Therefore, the object detection part 32 may identify the distance by using the input from the radar device 20 with emphasis and may identify the lateral location by using the result of the image analysis of the camera 10 with emphasis.

Figure 3:
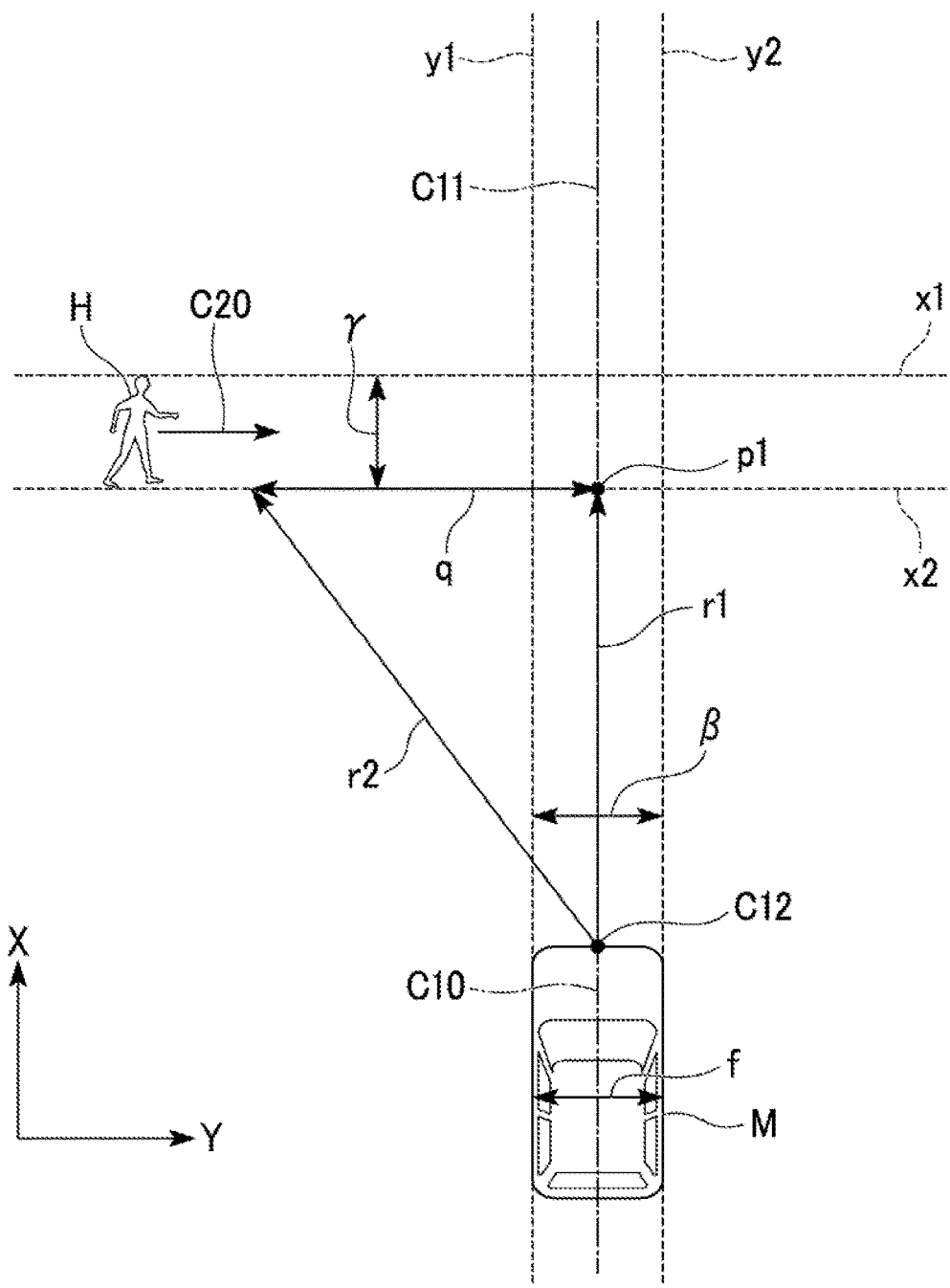
FIG. 3 is a diagram showing an example of a relationship among a vehicle, a laterally moving object, a distance r, and a lateral location q.

FIG. 3 is a diagram showing an example of a relationship among the vehicle M, the laterally moving object H, a distance r, and a lateral location q. In the embodiment, the vehicle M moves in the +X-axis direction, and the laterally moving object H moves in the +Y-axis direction perpendicular to the X-axis direction.

The distance r is a distance between the vehicle M and the laterally moving object H. The distance r may be defined as a distance r1 between a vehicle front end portion C12 of the vehicle M and a projection position p1 obtained by projecting the laterally moving object H on a virtual line C11 obtained by extending a vehicle central axis C10 of the vehicle M, the vehicle central axis C10 being parallel to the X-axis direction. Alternatively, the distance r may be defined as an actual distance r2 between the laterally moving object H and the vehicle front end portion C12 of the vehicle M. In the following description, the distance r is defined as the distance r1. Note that, the projection position p1 is a point obtained by projecting the front end portion of the laterally moving object H on the virtual line C11.

The lateral location q is defined as the shortest distance between the laterally moving object H and the virtual line C11.

A predicted region where the vehicle M will be running in the future (hereinafter, referred to as an intended travel path β) is a region between a virtual line y1 that extends from the left side (left end portion) of the vehicle M and a virtual line y2 that extends from the right side (right end portion) of the vehicle M. Note that, the virtual line y1 and the virtual line y2 are lines parallel to the vehicle central axis C10 of the vehicle M.

A predicted region where the laterally moving object H will be running in the future (hereinafter, referred to as an intended travel path γ) is a region between a virtual line x1 that extends from the left side (left end portion) of the laterally moving object H and a virtual line x2 that extends from the right side (right end portion) of the laterally moving object H. Note that, the virtual line x1 and the virtual line x2 are lines parallel to a travel direction C20 of the laterally moving object H.

With reference back to FIG. 2, description of each configuration is continued.

The estimation part 33 estimates a relationship between a future location of the vehicle M and a future location of the laterally moving object H based on a location of the laterally moving object H detected by the object detection part 32.

The estimation part 33 estimates a future location of the vehicle M based on the movement direction of the vehicle M and a vehicle width f of the vehicle M. In the embodiment, the estimation part 33 obtains the intended travel path β as the future location of the vehicle M. Further, the estimation part 33 calculates an amount of time to a time point when the possibility that the vehicle M will collide with the laterally moving object H is high (hereinafter, referred to as a collision time (TTC; Time to Collision)), based on the location of the laterally moving object H detected by the object detection part 32. In the embodiment, the estimation part 33 obtains an amount of time for the vehicle M to arrive at the virtual line x2 as the TTC.

The estimation part 33 estimates the future location of the laterally moving object H based on the change of the location of the laterally moving object H. In the embodiment, the estimation part 33 obtains the movement direction and the speed of the laterally moving object H based on the change of a plurality of past locations of the laterally moving object H and estimates the location where the laterally moving object H arrives after the TTC elapses based on the movement direction and the speed.

The determination part 34 determines that there is a possibility that the vehicle M and the laterally moving object H will collide with each other in a case where the laterally moving object H is capable of passing the vehicle M without colliding with the vehicle M based on the relationship estimated by the estimation part 33 and a relationship between the vehicle M and the laterally moving object H when the laterally moving object H passes the vehicle M satisfies a predetermined condition. In the present embodiment, the estimation part 33 determines whether or not the relationship between the vehicle M and the laterally moving object H satisfies a predetermined condition when, ahead in the travel direction of the vehicle M, the laterally moving object H passes the vehicle M without coming into contact with the vehicle M. When the predetermined condition is satisfied, the determination part 34 determines that there is a possibility that the vehicle M and the laterally moving object H will collide with each other.

In the embodiment, the determination part 34 determines whether or not the laterally moving object H crosses ahead (in front) in the travel direction of the vehicle M without coming into contact with the vehicle M. Note that, "the laterally moving object H crosses ahead (in front) in the travel direction of the vehicle M represents that the laterally moving object H passes a scheduled region which the vehicle M passes after the TTC elapses, prior to the vehicle M.

When the determination part 34 determines that the laterally moving object H crosses ahead in the travel direction of the vehicle M, the determination part 34 determines whether or not the relationship between the vehicle M and the laterally moving object H when the laterally moving object H crosses in front of the vehicle M satisfies a predetermined condition. In the embodiment, when the determination part 34 determines that the laterally moving object H crosses in front of the vehicle M, the determination part 34 obtains, based on a future location of the laterally moving object H estimated by the estimation part 33, a hazard region K1 including a region (hereinafter, referred to as an extension region J1) that extends rearward in the travel direction of the laterally moving object H from the future location. In other words, the determination part 34 estimates the hazard region K1 including the extension region J1 and a region (hereinafter, referred to as a future location region H1) of the laterally moving object H positioned at the future location.

As the predetermined condition, it is possible to arbitrarily set a variety of conditions.

For example, a condition in which the intended travel path β and the hazard region K1 overlap each other at least in part may be set as the predetermined condition. In this case, when the hazard region K1 and the intended travel path β as the future location of the vehicle M overlap each other at least in part, the determination part 34 determines that there is a possibility that the vehicle M and the laterally moving object H will collide with each other.

The drive assist part 35 performs a variety of vehicle controls based on a determination result of the determination part 34 such that the driver of the vehicle M can safely drive. In the present embodiment, the drive assist part 35 performs vehicle controls based on a determination result of the determination part 34 such that it is possible to avoid a collision between the vehicle M and the laterally moving object H. Specifically, the drive assist part 35 outputs a signal used to output an alarm for notification of a collision possibility to the loudspeaker 60 based on a determination result of the determination part 34. Further, the drive assist part 35 performs, based on a determination result of the determination part 34, a control which causes the electronically-controlled brake device 70 to automatically output a braking force or a control which causes the power steering device 80 to automatically output a steering force.

Figure 4:
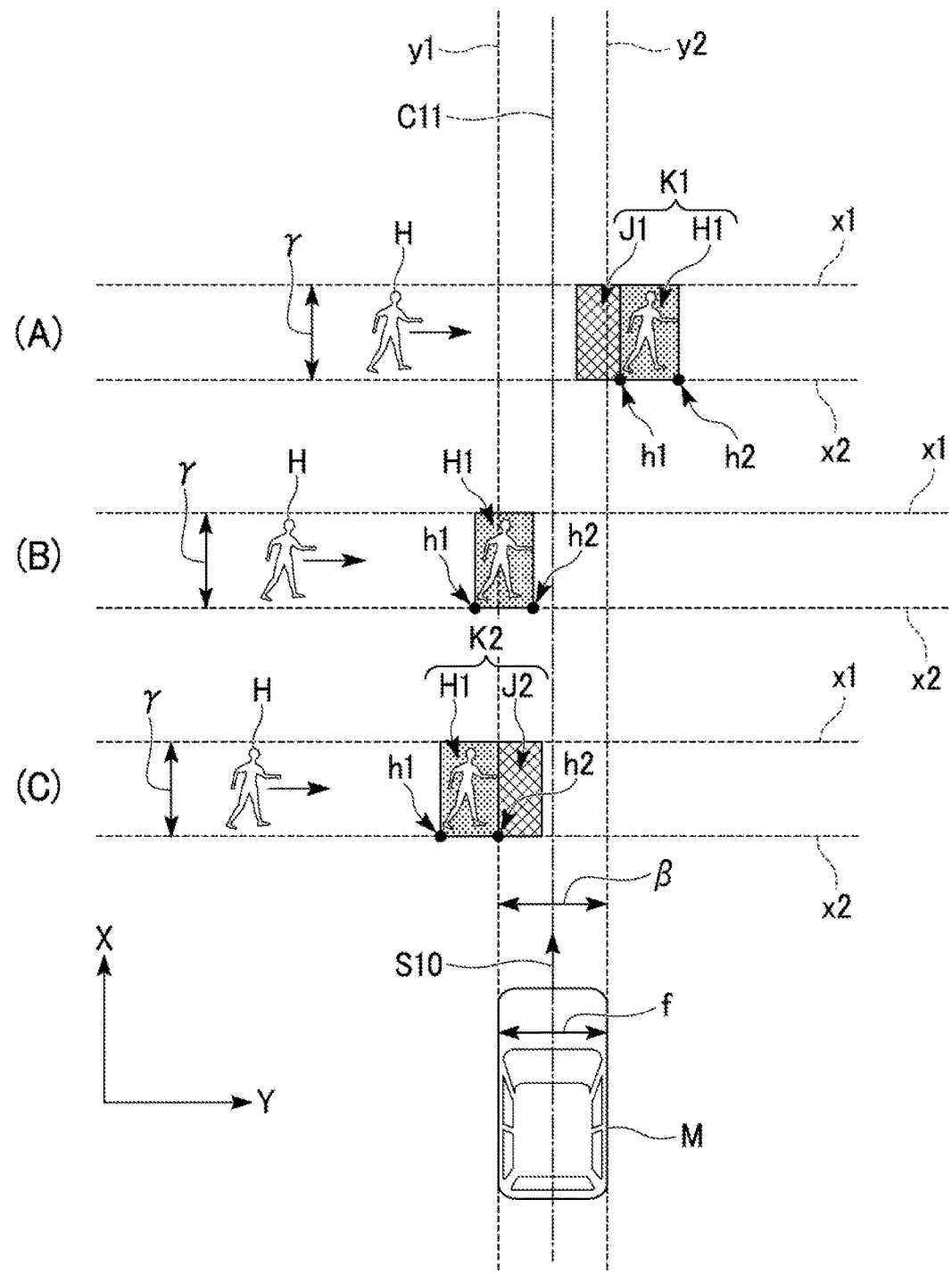
FIG. 4 is a diagram showing an example of a position relationship between a future location of the laterally moving object and a future location of the vehicle.

Here, with reference to FIG. 4, an example of a position relationship between a future location of the laterally moving object H and a future location of the vehicle M is described. FIG. 4 is a diagram showing an example of the position relationship between the future location of the laterally moving object H and the future location of the vehicle M.

Part (A) of FIG. 4 is a diagram showing an example of a position relationship in which the laterally moving object H crosses ahead in the travel direction of the vehicle M without coming into contact with the vehicle M. As shown in part (A) of FIG. 4, the whole of the future location region H1 of the laterally moving object H is positioned on the more right side of the vehicle M than the virtual line y2 that extends in the travel direction of the vehicle M. For example, when a rear end portion h1 of the future location region H1 of the laterally moving object H is positioned on the more right side of the vehicle M than the virtual line y2, the determination part 34 can determine that the laterally moving object H passes the intended travel path β prior to the vehicle M. In this case, although a possibility that the vehicle M and the laterally moving object H will collide with each other is low, there is a case in which the distance between the front end portion of the vehicle M and the rear end portion of the laterally moving object H when the vehicle M and the laterally moving object H pass each other becomes narrow, and it is supposed that a person as the laterally moving object H or a driver of the vehicle M may feel afraid.

Part (B) of FIG. 4 is a diagram showing an example of a position relationship in which there is a possibility that the laterally moving object H will collide with the vehicle M and in which the future location region H1 of the laterally moving object H overlaps the intended travel path β.

As shown in part (B) of FIG. 4, the future location region H1 of the laterally moving object H overlaps the intended travel path β of the vehicle M. For example, when a front end portion h2 of the future location region H1 of the laterally moving object H is positioned on the more right side of the vehicle M than the virtual line y1 and the rear end portion h1 of the future location region H1 of the laterally moving object H is positioned on the more left side of the vehicle M than the virtual line y1, the determination part 34 can determine that there is a possibility that the laterally moving object H will collide with the vehicle M from the side in a state where the vehicle M runs the intended travel path β.

Part (C) of FIG. 4 is a diagram showing an example of a position relationship in which the laterally moving object H does not cross the vehicle M and in which the future location region H1 of the laterally moving object H does not overlap the intended travel path β. As shown in part (C) of FIG. 4, the future location region H1 of the laterally moving object H is positioned on the more left side of the vehicle M than the intended travel path β. For example, when the front end portion h2 of the future location region H1 of the laterally moving object H is positioned on the more left side of the vehicle M than the virtual line y1, the determination part 34 can determine that the vehicle M passes the intended travel path β and then the laterally moving object H passes the location which the vehicle M has passed. In this case, although a possibility that the vehicle M and the laterally moving object H will collide with each other is low, there is a case in which the distance between the rear end portion of the vehicle M and the front end portion of the laterally moving object H when the vehicle M and the laterally moving object H pass each other becomes narrow, and it is supposed that a person as the laterally moving object H or a driver of the vehicle M may feel afraid. However, a collision determination in the position relationship shown in part (C) of FIG. 4 is not included in the embodiment of the present invention.

In the case of the position relationship shown in part (A) of FIG. 4, the determination part 34 according to the present embodiment determines, based on a future location of the laterally moving object H estimated by the estimation part 33, the extension region J1 that extends rearward in the travel direction of the laterally moving object H from the future location. Then, the determination part 34 determines that there is a possibility that the vehicle M and the laterally moving object H will collide with each other in a case where the hazard region K1 including the future location region H1 and the extension region J1 overlaps the intended travel path β.

Further, in the case of the position relationship shown in part (C) of FIG. 4, the determination part 34 may determine, based on a future location of the laterally moving object H estimated by the estimation part 33, an extension region J2 that extends forward in the travel direction of the laterally moving object H from the future location. Then, the determination part 34 determines that there is a possibility that the vehicle M and the laterally moving object H will collide with each other in a case where a hazard region K2 including the future location region H1 and the extension region J2 overlaps the intended travel path β. Hereinafter, a process of determining a collision possibility based on the extension region J2 that extends forward in the travel direction of the laterally moving object H is referred to as a forward process.

The storage part 36 stores information used to obtain the lengths in the Y-axis direction of the extension regions J1, J2 depending on the amplitude of a speed of the laterally moving object H, the movement amount of the laterally moving object H, the frequency of detecting the laterally moving object H by the object detection part 32, the duration that the object detection part 32 continues detecting the laterally moving object H, the type of the laterally moving object H, and the like. The determination part 34 determines the lengths in the Y-axis direction of the extension regions J1, J2 with reference to the storage part 36. In the embodiment, the lengths in the Y-axis direction of the extension regions J1, J2 are set such that the lengths increase in proportion to the amplitude of a speed of the laterally moving object H, the movement amount of the laterally moving object H, the frequency of detecting the laterally moving object H by the object detection part 32, and the duration that the object detection part 32 continues detecting the laterally moving object H and become constant from a predetermined value.

Figure 5:
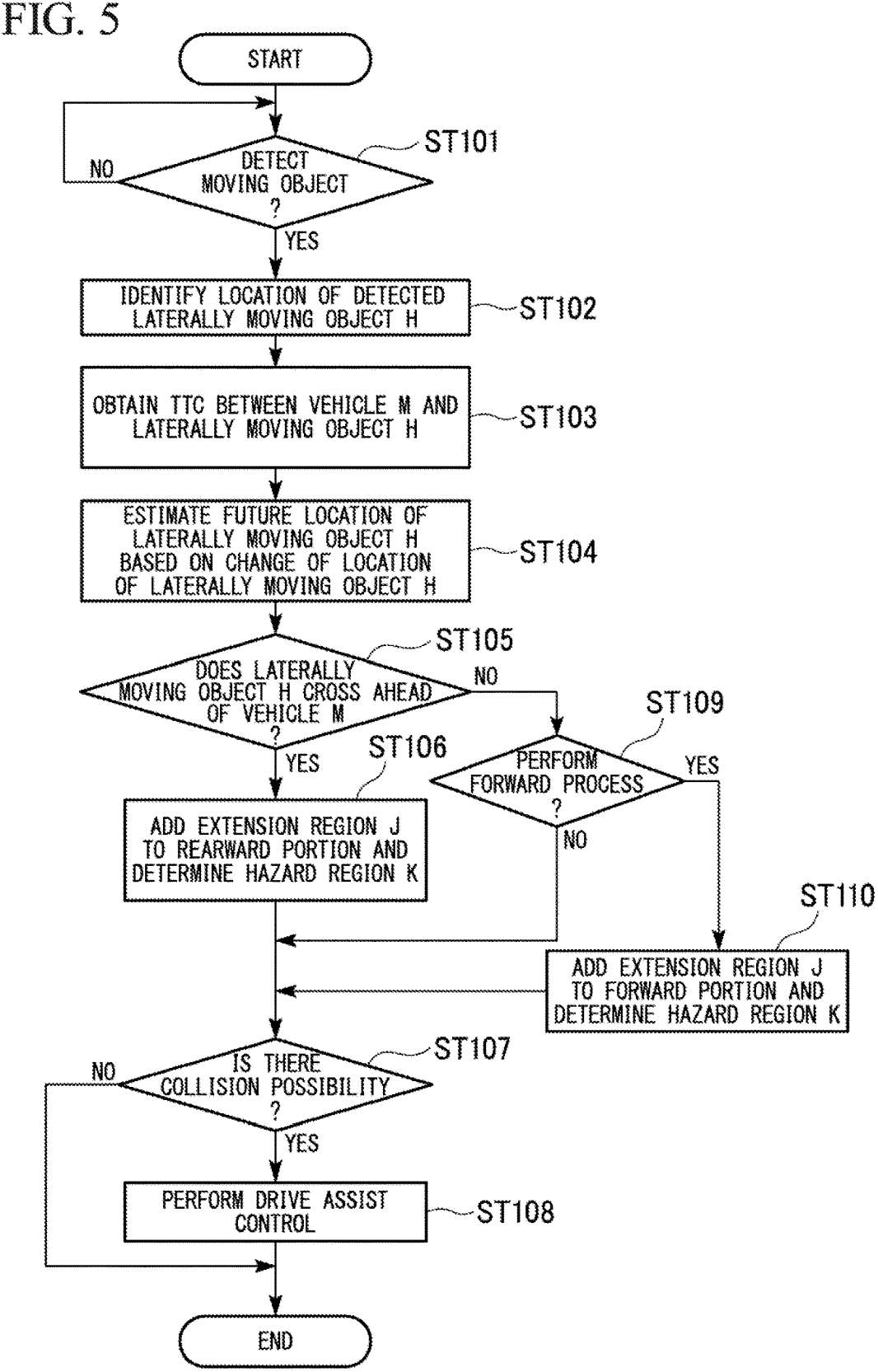
FIG. 5 is a flowchart used to describe a process example according to the collision avoidance assist apparatus.

Next, with reference to FIG. 5, a process example according to the collision avoidance assist apparatus 1 is described. FIG. 5 is a flowchart used to describe a process example according to the collision avoidance assist apparatus 1.

The object detection part 32 detects the laterally moving object H based on image data input from the camera 10 and a signal input from the radar device 20 (step ST101).

When the laterally moving object H is detected, the object detection part 32 identifies the location of the detected laterally moving object H based on the image data input from the camera 10 and the location of the laterally moving object H input from the radar device 20 (step ST102). The object detection part 32 detects the laterally moving object H at a plurality of time points and identifies the location of the laterally moving object H at each of the time points.

Further, the object detection part 32 obtains the TTC based on the location of the identified laterally moving object H and the detection result from the vehicle speed sensor 40 (step ST103). In the embodiment, the object detection part 32 divides the distance r1 between the vehicle M and the laterally moving object H by a speed S10 of the vehicle M detected by the speed sensor 40 and obtains the time TTC to arrive at the intended travel path γ of the laterally moving object H when the vehicle M continues running at the speed S10.

The estimation part 33 estimates a location at which the laterally moving object H arrives after the TTC elapses (for example, the location of the rear end portion h1 and the location of the front end portion h2 of the laterally moving object H positioned at the future location) based on the change of the location of the laterally moving object H detected by the object detection part 32 (step ST104).

Next, the determination part 34 determines whether or not the laterally moving object H crosses ahead of the vehicle M based on the location of the rear end portion h1 and the location of the front end portion h2 estimated by the estimation part 33 (step ST105). In the embodiment, the determination part 34 determines whether or not the rear end portion h1 in the future location of the laterally moving object H is positioned on the more right side of the vehicle M than the virtual line y2. When the rear end portion h1 in the future location is positioned on the more right side of the vehicle M than the virtual line y2, the determination part 34 determines that the laterally moving object H crosses ahead of the vehicle M.

When the determination part 34 determines that the laterally moving object H crosses ahead of the vehicle M (step ST105—YES), the determination part 34 determines an extension region J1 that extends rearward in the travel direction of the laterally moving object H based on the future location of the laterally moving object H estimated by the estimation part 33 and determines a hazard region K1 including a future location region H1 and the extension region J1 (step ST106). In the embodiment, with reference to the storage part 36, the determination part 34 determines the length in the Y-axis direction of the extension region J1 according to the speed of the laterally moving object H and determines the location of the extension region J1 based on the rear end portion h1 in the future location of the laterally moving object H.

Next, the determination part 34 determines a collision possibility of the moving object based on the estimation result of the estimation part 33 (step ST107). In the embodiment, the determination part 34 determines whether or not an intended travel path 13 of the vehicle M and the hazard region K1 overlap each other. The determination part 34 determines that there is a possibility that the vehicle M and the laterally moving object H will collide with each other when the intended travel path β of the vehicle M and the hazard region K1 overlap each other. On the other hand, the determination part 34 determines that there is no possibility that the vehicle M and the laterally moving object H will collide with each other when the intended travel path β of the vehicle M and the hazard region K1 do not overlap each other.

When the determination part 34 determines that there is a possibility that the vehicle M and the laterally moving object H will collide with each other (step ST107—YES), the drive assist part 35 performs a drive assist of the vehicle (step ST108). In the embodiment, the drive assist part 35 controls the electronically-controlled brake device 70 and causes the vehicle M to stop. Note that, the drive assist part 35 may control the power steering device 80 and turn the vehicle M to the opposite direction of the travel direction of the laterally moving object H.

On the other hand, when the determination part 34 determines that there is no possibility that the vehicle M and the laterally moving object H will collide with each other (step ST107—NO), the control device 30 ends the process.

In the determination of step ST105, when the determination part 34 determines that the laterally moving object H does not cross the vehicle M ahead in the travel direction of the vehicle M (step ST105—NO), the determination part 34 determines whether or not the forward process is performed (step ST109). For example, the user sets in advance whether or not the determination of the forward process is performed.

When the determination part 34 determines that the forward process is not performed (step ST109—NO), the determination part 34 determines whether or not the intended travel path β of the vehicle M and the future location region H1 of the laterally moving object H overlap each other. When the intended travel path β of the vehicle M and the future location region H1 of the laterally moving object H overlap each other, the determination part 34 determines that there is a possibility that the vehicle M and the laterally moving object H will collide with each other. On the other hand, when the intended travel path β of the vehicle M and the future location region H1 of the laterally moving object H do not overlap each other, the determination part 34 determines that there is no possibility that the vehicle M and the laterally moving object H will collide with each other.

On the other hand, when the determination part 34 determines that the forward process is performed (step ST109—YES), the determination part 34 determines an extension region J2 that extends forward in the travel direction of the laterally moving object H based on the future location of the laterally moving object H estimated by the estimation part 33 and determines a hazard region K2 including the future location region H1 and the extension region J2 (step ST110). In the embodiment, the determination part 34 determines the length in the Y-axis direction of the extension region J2 according to the speed of the laterally moving object H and determines the location of the extension region J2 based on the front end portion h2 in the future location of the laterally moving object H.

Then, the determination part 34 moves onto step ST107 and determines whether or not the intended travel path β of the vehicle M and the hazard region K2 overlap each other.

Figure 6:
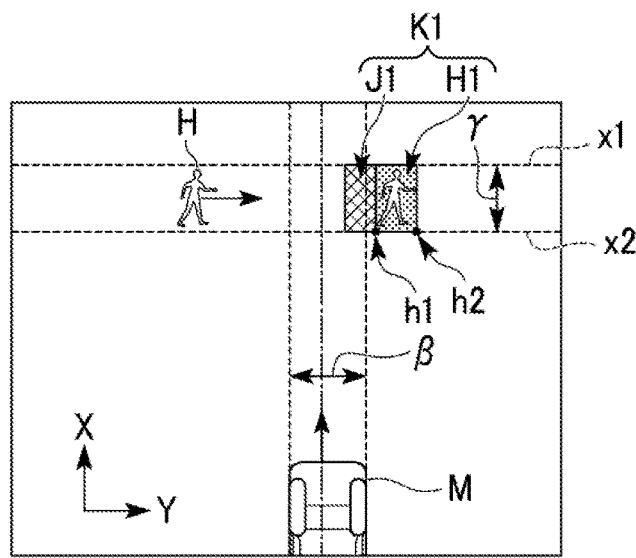
FIG. 6 is a diagram used to describe an example of a control result of a drive assist part.
Figure 6:
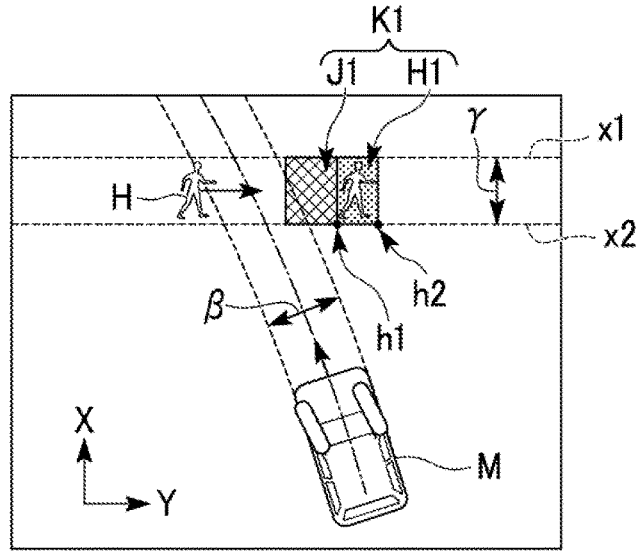
Figure 6:
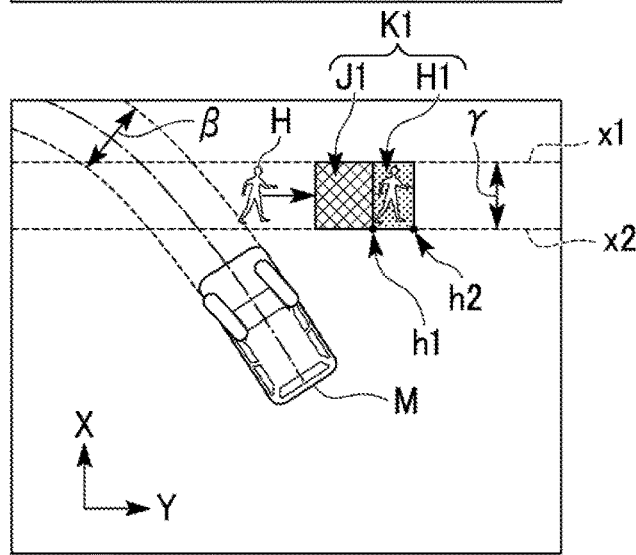

Next, with reference to FIG. 6, an example of a control result of the drive assist part 35 is described. FIG. 6 is a diagram used to describe an example of a control result of the drive assist part 35.

Part (A) of FIG. 6 is a diagram showing a position relationship in a case where the laterally moving object H crosses ahead in the travel direction of the vehicle M. In the example shown in the drawing, since the hazard region K1 overlaps the intended travel path β, the determination part 34 determines that there is a possibility that the vehicle M and the laterally moving object H will collide with each other. In this case, the drive assist part 35 derives a target path capable of avoiding the hazard region K1 based on the hazard region K1 of the laterally moving object H, obtains a steering angle for defining the target path, and controls the power steering device 80 based on the obtained steering angle. In the embodiment, the drive assist part 35 controls the power steering device 80 such that the vehicle M turns to the left by the obtained steering angle. Part (B) of FIG. 6 shows a state in which the vehicle M turns to the left based on the control by the drive assist part 35.

Part (B) of FIG. 6 is a diagram showing a position relationship after the position relationship shown in part (A) of FIG. 6 arises. In the state shown in part (B) of FIG. 6, although the vehicle M turns to the left from the state shown in part (A) of FIG. 6, the extension region J1 still overlaps the intended travel path β. Therefore, the determination part 34 determines that there is a possibility that the vehicle M and the laterally moving object H will collide with each other. In this case, the drive assist part 35 derives a target path capable of avoiding the hazard region K1 based on the hazard region K1 of the laterally moving object H, obtains a steering angle for defining the target path, and controls the power steering device 80 based on the obtained steering angle. In the embodiment, the drive assist part 35 controls the power steering device 80 such that the vehicle M further turns to the left by the obtained steering angle. Part (C) of FIG. 6 shows a state in which the vehicle M further turns to the left based on the control by the drive assist part 35.

Note that, in the state of part (A) of FIG. 6, the drive assist part 35 can obtain a steering angle such that the intended travel path β of the vehicle M is capable of avoiding the future location region H1 of the laterally moving object H based on the position relationship between the intended travel path β of the vehicle M and the future location region H1 of the laterally moving object H.

Further, in the state of part (B) of FIG. 6, the drive assist part 35 can obtain a steering angle such that the intended travel path β of the vehicle M is capable of avoiding the extension region J1 of the laterally moving object H based on the position relationship between the intended travel path β of the vehicle M and the extension region J1 of the laterally moving object H.

The example in FIG. 6 shows an example in which the length in the Y-axis direction of the extension region J1 becomes longer in accordance with the increase in the number of detections of the laterally moving object H.

As described above, the collision avoidance assist apparatus 1 according to the present embodiment includes the determination part 34 which determines that there is a possibility that the vehicle M and the laterally moving object H will collide with each other in a case where the relationship between the vehicle M and the laterally moving object H satisfies a predetermined condition when the laterally moving object H will not collide with the vehicle M and crosses ahead of the vehicle M. Thereby, even when a collision is avoidable but the vehicle M and the laterally moving object H are too close to each other when the laterally moving object H actually crosses in front of the vehicle M, it is possible to perform a drive assist of the vehicle M. Accordingly, the vehicle M can be away from the laterally moving object H when the vehicle M crosses the laterally moving object H, and it is possible to reduce the possibility of the person as the laterally moving object H or the driver who drives the vehicle M being startled.

Further, the collision avoidance assist apparatus 1 according to the present embodiment includes the determination part 34 which obtains the hazard region K1 including the extension region J1 extending rearward in the travel direction of the laterally moving object H positioned at the future location based on the future location of the laterally moving object H estimated by the estimation part 33 and determines that there is a possibility that the vehicle M will collide with the laterally moving object H in a case where the hazard region K1 and the intended travel path β as the future location of the vehicle M overlap each other. Thereby, it is possible to prevent the rearward portion of the laterally moving object H and the vehicle M from being too close to each other when the laterally moving object H actually crosses in front of the vehicle M.

Further, the determination part 34 of the collision avoidance assist apparatus 1 according to the present embodiment can change the size of the extension regions J1, J2 depending on the amplitude of the speed of the laterally moving object H. It is supposed that the person as the laterally moving object H or the driver of the vehicle M further feels a scare when passing the laterally moving object H having a fast movement speed compared to when passing the laterally moving object H having a slow movement speed. In the embodiment, the determination part 34 makes the length in the Y-axis direction of the extension regions J1, J2 longer as the speed of the laterally moving object H is greater and makes the length in the Y-axis direction of the extension regions J1, J2 shorter as the speed of the laterally moving object H is smaller. Thereby, it is possible to make the distance between the vehicle M and the laterally moving object H when passing the laterally moving object H having a fast movement speed greater than the distance between the vehicle M and the laterally moving object H when passing the laterally moving object H having a slow movement speed.

Hereinbefore, the embodiments of the invention are described with reference to the accompanying drawings, but the invention is not limited to the embodiments. A variety of changes and substitutions can be made without departing from the scope of the invention.

The above embodiment is described using an example in which the determination part 34 determines whether or not the predetermined condition is satisfied and the drive assist part 35 performs a drive assist based on the determination result of the determination part 34; however, the embodiment is not limited thereto.

For example, the determination part 34 may determine whether or not the hazard region K1 and the intended travel path β overlap each other at least in part and may determine that there is no possibility that the vehicle M and the laterally moving object H will collide with each other when the determination part 34 determines that the hazard region K1 and the intended travel path β do not overlap each other. Then, the drive assist part 35 may determine whether or not the hazard region K1 and the intended travel path β overlap each other at least in part and may perform a drive assist of the vehicle M when the drive assist part 35 determines that the hazard region K1 and the intended travel path β overlap each other.

According to this configuration, the functional configuration which determines a collision possibility between the vehicle M and the laterally moving object H based on the future location region H1 can be used as is while only a part is added, and thereby it is possible to implement the collision avoidance assist apparatus 1 according to the embodiment.

In the above embodiment, the estimation part 33 and the determination part 34 may be an integrated functional configuration. In this case, this functional configuration performs a steering control such that the vehicle M passes with a certain margin when the vehicle M passes backward in the travel direction of the laterally moving object H detected by the object detection part 32.

The above embodiment is described using an example in which the determination part 34 changes the size of the extension regions J1, J2 depending on the type of the laterally moving object H; however, the embodiment is not limited thereto.

For example, the determination part 34 may change the size of the extension regions J1, J2 depending on the number of times that the object detection part 32 detects the laterally moving object H. This is because, as the number of detections of the laterally moving object H is increased, the reliability of the location of the laterally moving object H is improved, and eventually the reliability of the future location of the laterally moving object H is also improved. Accordingly, by changing the size of the extension regions J1, J2 depending on the number of detections of the laterally moving object H, it is possible to further appropriately ensure the extension regions J1, J2 in accordance with the future location of the laterally moving object H.

Further, the determination part 34 may change the size of the extension regions J1, J2 depending on the type of the laterally moving object H. This is because the motion of the laterally moving object H differs among a case in which the laterally moving object H is a person, a case in which the laterally moving object H is a bicycle (on which a person rides), and a case in which the laterally moving object H is a motorcycle (on which a person rides). Accordingly, by changing the size of the extension regions J1, J2 depending on the type of the laterally moving object H, it is possible to further appropriately ensure the extension regions J1, J2 in accordance with the type of the laterally moving object H.

The above embodiment is described using an example in which the determination part 34 determines a collision possibility based on the hazard regions K1, K2 obtained by adding the extension regions J1, J2 to the future location of the laterally moving object H; however, the embodiment is not limited thereto. For example, the determination part 34 may determine a collision possibility based on a modified hazard region obtained by adding an extension region J3 to the future location of the vehicle M.

Figure 7:
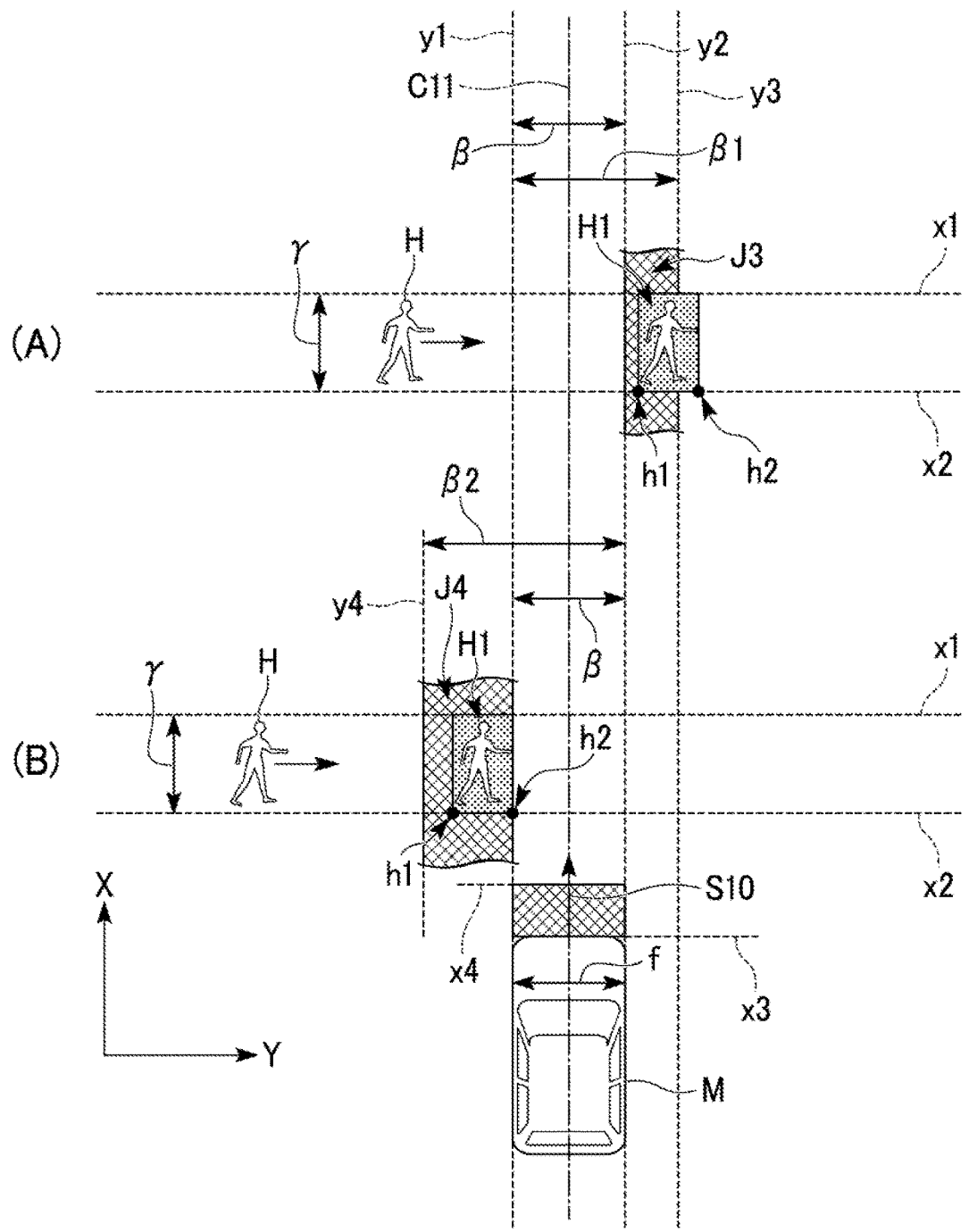
FIG. 7 is a diagram showing an example of a position relationship between a future location of the laterally moving object and a future location of the vehicle.

Here, with reference to FIG. 7, an example of a position relationship between a future location of the laterally moving object H and a future location of the vehicle M is described. FIG. 7 is a diagram showing an example of a position relationship between a future location of the laterally moving object H and a future location of the vehicle M.

Similarly to part (A) of FIG. 4, part (A) of FIG. 7 is a diagram showing an example of a position relationship in which the laterally moving object H crosses the vehicle M ahead in the travel direction of the vehicle M. As shown in part (A) of FIG. 7, the future location region H1 of the laterally moving object H is positioned on the more right side of the vehicle M than the virtual line y2 that extends in the travel direction of the vehicle M. In this case, the determination part 34 determines an extension region J3 that extends forward in the travel direction of the laterally moving object H from the future location of the vehicle M based on the intended travel path β as the future location of the vehicle M estimated by the estimation part 33. Specifically, the estimation part 33 sets a virtual line y3 on the more right side of the vehicle M by a predetermined length than the virtual line y2 and sets a region between the virtual line y1 and the virtual line y3 as an intended travel path β1 as the future location of the vehicle M. Then, the determination part 34 determines that there is a possibility that the vehicle M and the laterally moving object H will collide with each other when the intended travel path β1 including the intended travel path β and the extension region J3 overlaps the future location region H1 of the laterally moving object H.

Similarly to part (C) of FIG. 4, part (B) of FIG. 7 is a diagram showing an example of a position relationship in which the laterally moving object H does not cross in front of the vehicle M and the future location region H1 of the laterally moving object H does not overlap the intended travel path β. As shown in part (B) of FIG. 7, the future location region H1 of the laterally moving object H is positioned on the more left side of the vehicle M than the intended travel path β. In this case, the determination part 34 determines an extension region J4 that extends rearward in the travel direction of the laterally moving object H from the future location of the vehicle M based on the intended travel path β as the future location of the vehicle M estimated by the estimation part 33. Specifically, the estimation part 33 sets a virtual line y4 on the more left side of the vehicle M by a predetermined length than the virtual line y1 and sets a region between the virtual line y4 and the virtual line y2 as an intended travel path β2 as the future location of the vehicle M. Then, the determination part 34 determines that there is a possibility that the vehicle M and the laterally moving object H will collide with each other when the intended travel path β2 including the intended travel path β and the extension region J4 overlaps the future location region H1 of the laterally moving object H. However, a collision determination in the position relationship shown in part (B) of FIG. 7 is not included in the embodiment of the present invention.

The above embodiment is described using an example in which the determination part 34 calculates the TTC based on a present location in which the front end portion of the vehicle M is positioned at x3; however, the embodiment is not limited thereto. For example, the determination part 34 may displace the present location of the vehicle M by a predetermined length in the travel direction of the vehicle M. FIG. 7 shows an example in which the front end portion of the present location of the vehicle M is extended to x4. The determination part 34 calculates a TTC(1) based on the present location in which the front end portion of the vehicle M is positioned at x3 and calculates a TTC(2) based on the present location in which the front end portion of the vehicle M is positioned at x4. The determination part 34 calculates the future location of the laterally moving object H with respect to the calculated TTC(1). The determination part 34 calculates the future location of the laterally moving object H with respect to the calculated TTC(2). The determination part 34 determines a possibility that the vehicle M and the laterally moving object H will collide with each other based on the future location of the laterally moving object H calculated with respect to the TTC(1) and the future location of the laterally moving object H calculated with respect to the TTC(2).

The above embodiment is described using an example in which the determination part 34 sets a condition in which the hazard region K and the intended travel path β overlap each other at least in part as the predetermined condition; however, the embodiment is not limited thereto.

For example, a condition in which the distance between the future location of the vehicle M and the future location of the laterally moving object H is less than a predetermined distance may be set as the predetermined condition. The determination part 34 determines that there is a possibility that the vehicle M and the laterally moving object H will collide with each other when the distance between the future location of the vehicle M and the future location of the laterally moving object H is less than the predetermined distance.

Further, a condition in which time for the vehicle M to arrive at a movement path of the laterally moving object H indicated by the future location is less than a predetermined time may be set as the predetermined condition. The determination part 34 determines that there is a possibility that the vehicle M and the laterally moving object H will collide with each other when the time for the vehicle M to arrive at the movement path of the laterally moving object H indicated by the future location is less than the predetermined time.

When the above-described predetermined condition is set, the determination part 34 may change the predetermined distance or the predetermined time depending on the amplitude of the speed of the laterally moving object H. For example, as the amplitude of the speed of the moving object is increased, the predetermined distance or the predetermined time is made greater.

The above embodiment is described using an example in which the collision avoidance assist apparatus 1 is provided on the vehicle M; however, the collision avoidance assist apparatus 1 may be a portable phone or a fixing apparatus arranged at the roadside. Further, the collision avoidance assist apparatus 1 may be provided on a moving object other than a vehicle.

The above embodiment is described using an example in which the object detection part 32 detects a person as the laterally moving object H; however, the detected laterally moving object H is not limited to a person. The object detection part 32 may identify only the location of the laterally moving object H having a feature of a predetermined detection target based on the attribute of the laterally moving object H, of the detected laterally moving object H. The object detection part 32 may identify, for example, the location of a bicycle, a motorcycle, a vehicle, or the like.

Further, the functional part corresponding to the object detection part 32 may be realized by a computer device embedded in or attached to the camera 10. Further, the method of identifying the location of the laterally moving object H using both of the camera 10 and the radar device 20 is just an example. The collision avoidance assist apparatus 1 may identify the location of the laterally moving object H using only the radar device 20. Alternatively, the collision avoidance assist apparatus 1 may identify the location of the laterally moving object H using a stereo camera.

Further, the control device 30 in the above-described embodiment may be realized in part or in whole as an integrated circuit such as an LSI (Large Scale Integration). The functional blocks of the control device 30 may be individually realized as a processor or may be integrated in part or in whole to be realized as a processor. Further, the method of realizing an integrated circuit is not limited to an LSI, and the control device 30 may be realized as a dedicated circuit or a universal processor. Further, when a technology of realizing an integrated circuit alternative to an LSI emerges thanks to the progress of a semiconductor technology, an integrated circuit according to the technology may be used.

What is claimed is:

1. A collision avoidance assist apparatus comprising:
an output unit that includes at least one of a reporting device, a braking device, and a steering device; and
a processor configured to:
(a) calculate an estimated time to collision, which is an amount of time for a first moving object to arrive at a virtual line that extends from a right end portion of a second moving object in a travel direction of the second moving object and that is parallel to the travel direction of the second moving object, and determine whether the second moving object will cross into a scheduled region, which the first moving object will cross after the estimated time to collision elapses, prior to the first moving object;
(b) estimate a relationship between a future location of the first moving object after the estimated time to collision elapses and a future location of the second moving object after the estimated time to collision elapses based on a change in a current location of the second moving object when it is determined that the second moving object will cross into the scheduled region prior to the first moving object;
(c) determine whether or not the second moving object is capable of crossing in front of the first moving object without colliding with the first moving object based on the relationship estimated in (b), and determine whether or not the relationship estimated in (b) satisfies a predetermined condition; and
(d) perform a drive assist of the first moving object by controlling the output unit in response to a first determination result that the second moving object is capable of crossing in front of the first moving object without colliding with the first moving object, and a second determination result that the relationship estimated in (b) satisfies the predetermined condition,
wherein the processor is configured to:
obtain a hazard region including a region of the estimated future location of the second moving object after the estimated time to collision elapses, and an extension region that extends rearward in the travel direction of the second moving object positioned at the future location estimated in (b); and
perform the drive assist of the first moving object by controlling the output unit in a case where the hazard region, and the estimated future location of the first moving object after the estimated time to collision elapses, overlap each other.

2. The collision avoidance assist apparatus according to claim 1, wherein the processor is configured to change a size of the extension region depending on an amplitude of a speed of the second moving object.

3. The collision avoidance assist apparatus according to claim 1, wherein the processor is configured to perform the drive assist of the first moving object by controlling the output unit in a case where a distance between the estimated future location of the first moving object and the estimated future location of the second moving object based on the relationship estimated in (b) is less than a predetermined distance, or in a case where an amount of time for the first moving object to arrive at a path of the second moving object indicated by the estimated future location of the second moving object is less than a predetermined amount of time.

4. The collision avoidance assist apparatus according to claim 3, wherein the processor is configured to change the predetermined distance or the predetermined amount of time depending on an amplitude of a speed of the second moving object.

5. A collision avoidance assist method comprising the steps of:
(a) calculating an estimated time to collision, which is an amount of time for a first moving object to arrive at a virtual line that extends from a right end portion of a second moving object in a travel direction of the second moving object and that is parallel to the travel direction of the second moving object, and determining whether the second moving object will cross into a scheduled region, which the first moving object will cross after the estimated time to collision elapses, prior to the first moving object;
(b) estimating a relationship between a future location of the first moving object after the estimated time to collision elapses and a future location of the second moving object after the estimated time to collision elapses based on a change in a current location of the second moving object when it is determined that the second moving object will cross into the scheduled region prior to the first moving object in (a);
(c) determining whether or not the second moving object is capable of crossing in front of the first moving object without colliding with the first moving object based on the relationship estimated in (b), and determining whether or not the relationship estimated in (b) satisfies a predetermined condition; and
(d) performing a drive assist of the first moving object by controlling an output unit that includes at least one of a reporting device, a braking device, and a steering device in response to a first determination result that the second moving object is capable of crossing in front of the first moving object without colliding with the first moving object and a second determination result that the relationship estimated in (b) satisfies a predetermined condition,
wherein the method further comprises steps of:
obtaining a hazard region including a region of the estimated future location of the second moving object after the estimated time to collision time elapses, and an extension region that extends rearward in the travel direction of the second moving object positioned at the estimated future location of the second moving object estimated in (b); and
performing the drive assist of the first moving object by controlling the output unit in a case where the hazard region, and the estimated future location of the first moving object after the estimated time to collision elapses, overlap each other.

6. A non-transitory computer-readable recording medium including a program for causing a computer to execute:
(a) calculating an estimated time to collision, which is an amount of time for a first moving object to arrive at a virtual line that extends from a right end portion of a second moving object in a travel direction of the second moving object and that is parallel to the travel direction of the second moving object, and determining whether the second moving object will cross into a scheduled region, which the first moving object will cross after the estimated time to collision elapses, prior to the first moving object;

(b) estimating a relationship between a future location of the first moving object after the estimated time to collision elapses and a future location of the second moving object after the estimated time to collision elapses based on a change in a current location of the second moving object when it is determined that the second moving object will cross into the scheduled region prior to the first moving object in (a);

(c) determining whether or not the second moving object is capable of crossing in front of the first moving object without colliding with the first moving object based on the relationship estimated in (b), and determining whether or not the relationship estimated in (b) satisfies a predetermined condition; and (d) performing a drive assist of the first moving object by controlling an output unit that includes at least one of a reporting device, a braking device, and a steering device in response to a first determination result that the second moving object is capable of crossing in front of the first moving object without colliding with the first moving object and a second determination result that the relationship estimated in (b) satisfies the predetermined condition, wherein the program further causes the computer to execute steps of:

obtaining a hazard region including a region of the estimated future location of the second moving object after the estimated time to collision time elapses, and an extension region that extends rearward in the travel direction of the second moving object positioned at the estimated future location of the second moving object estimated in (b); and performing the drive assist of the first moving object by controlling the output unit in a case where the hazard region, and the future location of the first moving object after the estimated time to collision elapses, overlap each other.

* * * * *